(12) United States Patent
Allison et al.

(10) Patent No.: US 7,044,374 B2
(45) Date of Patent: May 16, 2006

(54) MOBILE DATA READING SYSTEM

(75) Inventors: Arthur J. Allison, Dallas, TX (US); Alan D. Rancourt, McKinney, TX (US)

(73) Assignee: Southwest Airlines Co., Dallas, TX (US)

( * ) Notice: Subject to any disclaimer, the term of this patent is extended or adjusted under 35 U.S.C. 154(b) by 135 days.

(21) Appl. No.: 10/643,462

(22) Filed: Aug. 19, 2003

(65) Prior Publication Data

US 2005/0040231 A1 Feb. 24, 2005

(51) Int. Cl.
*G06F 17/60* (2006.01)

(52) U.S. Cl. .................. 235/385; 235/384; 235/462.46
(58) Field of Classification Search ................ 235/385, 235/384, 462.01, 462.46, 472.46
See application file for complete search history.

(56) References Cited

U.S. PATENT DOCUMENTS

| | | | | |
|---|---|---|---|---|
| 5,361,871 A | * | 11/1994 | Gupta et al. ................... | 186/61 |
| 5,992,747 A | * | 11/1999 | Katoh et al. ........... | 235/462.43 |
| 6,594,503 B1 | * | 7/2003 | Herzig et al. ............ | 455/550.1 |
| 6,769,568 B1 | * | 8/2004 | Bonini et al. ................ | 221/123 |

* cited by examiner

*Primary Examiner*—Daniel St.Cyr
(74) *Attorney, Agent, or Firm*—Grady K. Bergen; Pamela S. Smith

(57) ABSTRACT

A mobile data reading system for reading bulky data-associated articles being manually handled by a user includes a frame mounted on rollers to facilitate moving the frame over a support surface to selected locations. A reader having a reader head is mounted to the frame for receiving a data signal from a data-associated item to be read when the article is brought within a proximal distance to the reader head without requiring handling of the reader head by the user during scanning of articles. The mobile data reading system also includes a data storage device for receiving and storing data associated with the received data signal and a power supply for supplying power to the reader.

33 Claims, 6 Drawing Sheets

US 7,044,374 B2

MOBILE DATA READING SYSTEM

TECHNICAL FIELD

The invention relates generally to data reading systems for reading data of data-associated items and methods of tracking such items.

BACKGROUND

Commercial aircraft that are typically used for transporting human passengers, their baggage and other articles that may accompany them, oftentimes may have capacity to carry additional cargo or other non-passenger items. Because commercial aircraft may fly to and from a variety of origins and destinations in a relatively short time frame, this provides an effective means of transporting such cargo very quickly to many locations, while also making use of the available capacity of the aircraft that would otherwise go unused. Mail and parcels are one type of cargo that has been delivered to various destinations through the use of commercial aircraft. In such situations, accurate tracking of the cargo is highly desirable. Unfortunately, most tracking operations are time consuming and involved. This makes it especially difficult to track items that are being transported via aircraft, where the amount of time between possession of the cargo by the air carrier and the flight departure may be limited.

Such prior art tracking of articles may involve the use of a handheld bar code reader or scanner for scanning bar codes associated with the items. Such handheld scanners may employ a pistol-style grip that facilitates holding of the scanner. When scanning of the bar code is executed with such scanners, a swiping or twisting action must be made with one's hand in order to pass the scan field over the bar code to ensure proper scanning. Because of the dexterity required, where numerous articles are involved, this can be quite fatiguing, and in extreme cases, may even result in repetitive motion injury to the individual.

Additionally, mail, parcels and other articles that are being transported may be grouped together in a manner that makes scanning of the individual articles difficult. The articles may be placed together in a stack, pile or other configuration that makes scanning of the bar code impossible without moving or adjusting the position of the articles. This may be quite difficult when using a handheld scanner, particularly when only one hand may be free to move or position the article to be scanned. The articles may be quite heavy, requiring the one performing the scan operation to set aside the handheld scanner so that the article or articles can be moved to a position where the bar code of the article being scanned is accessible. Furthermore, adjusting the position of such articles so that they can be scanned with a handheld scanner is quite time consuming and can result in time delays that may prevent the article or articles being shipped from reaching the next staging area or assigned flight to ensure that they are timely delivered. This is particularly true when the articles must be sorted, as well as scanned.

In most instances, after the article is scanned it must be moved to a different location. This may be to a different staging area, a cart or other transporting device. This also ensures that the article being scanned is not re-scanned, which may also slow the scanning operation. The person performing the scan must first scan the bar code of the article and then position the article in a different or sorted location for future handling. Thus, with handheld scanners, either the item must be moved with one hand or the handheld scanner must be set aside while the item is moved to the sorted location. Where the items are quite heavy or large, the scanner usually must be set aside. Such disruptive activities further delay the transporting and tracking process, making it less likely that article being tracked will be timely delivered.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 1A:
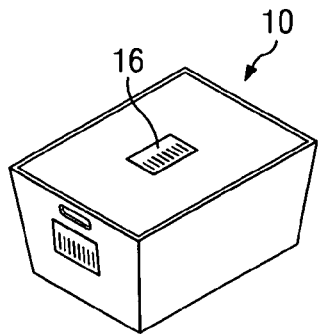
FIGS. 1A–1C show perspective views of various articles provided with a data tag, in accordance with the invention.
Figure 1B:
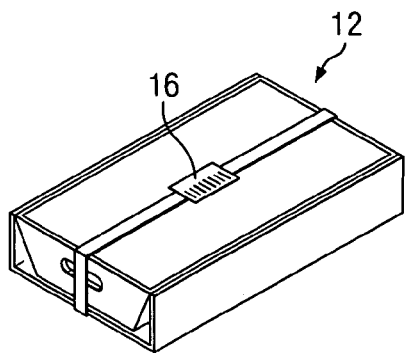
Figure 1C:
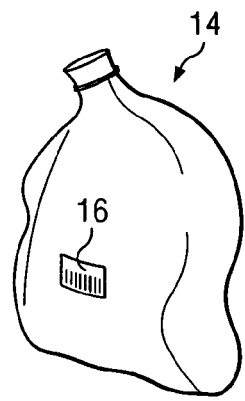

Referring to FIGS. 1A–1C various representative cargo items are shown. In particular, the items 10, 12 and 14 each may constitute mail containers that may contain one or more individual pieces of mail for delivery to a recipient's address which may be described or indicated thereon. Individual boxes, parcels or other articles (not shown), which may be addressed to a single recipient, and which may be too large to fit within one of the mail containers 10, 12, 14, may also be included.

Each of the mail containers 10, 12, 14 is provided with a data tag 16 that is affixed to the cargo item or article. The data of the data tag 16 is associated with the item to which it is attached. This may include, but is not limited to an article number or identifier, a flight code or identifier, a routing code or identifier, a zip code, a destination or destination station identifier, an origin identifier, article type, article weight, etc. In the embodiment shown, the data tag 16 constitutes an optically scannable bar code or optically readable device. The bar code may include a one-dimensional code, such as a Code-93 or Code 128 bar code; a two dimensional matrix or bar code, such as the PDF417 two-dimensional code; or even a three-dimensional (raised) code. A radio frequency identification device (RFID) or other readable data-containing device that may be read when brought into proximity to a compatible reader may also be used.

Figure 2:
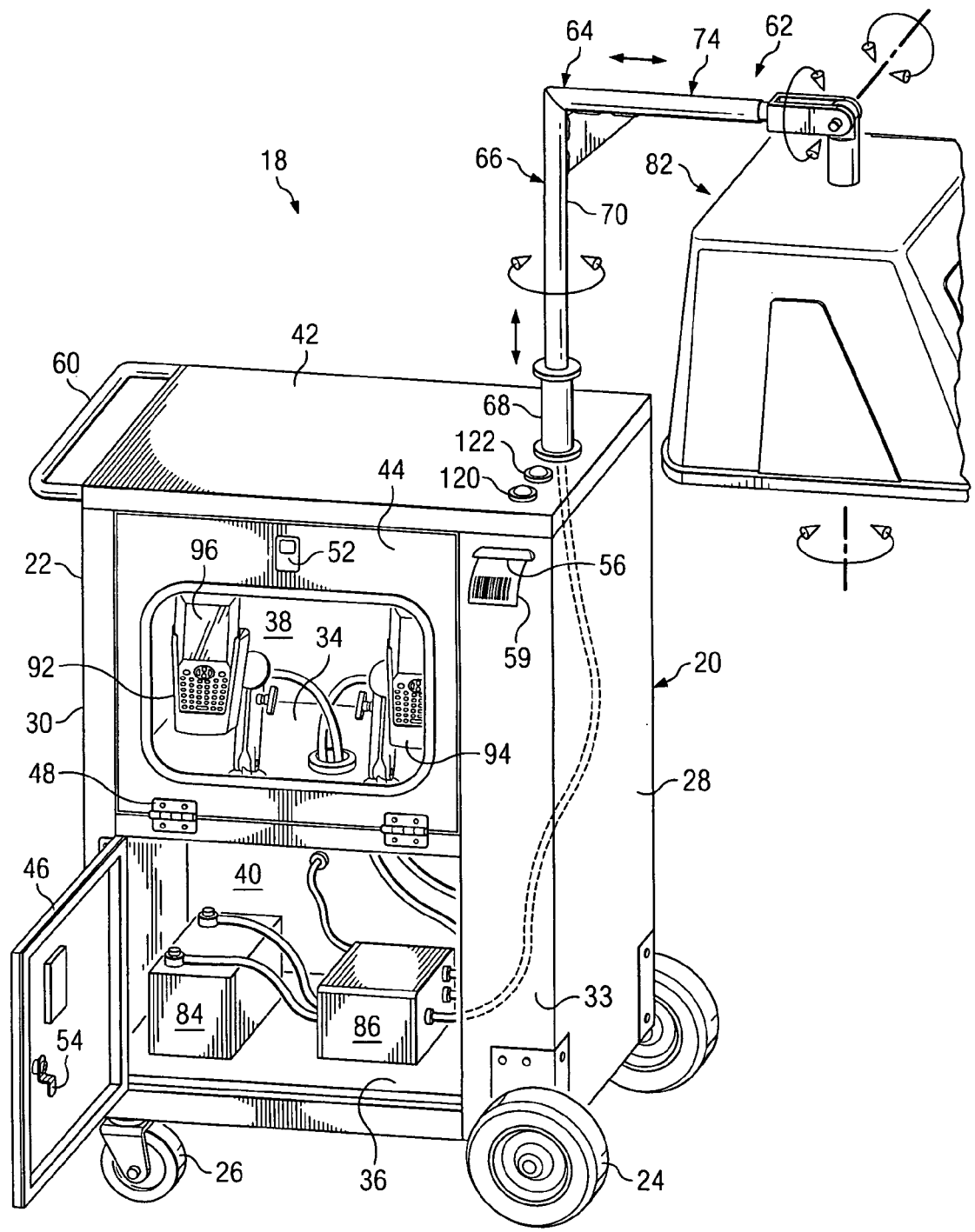
FIG. 2 is a right side perspective view of a mobile data reading system constructed in accordance with the invention.

Referring to FIG. 2, a mobile data reading system 18 is shown. The system 18 consists of a cart 20 having a frame 22 that is mounted on rollers or wheels 24, 26. In certain embodiments that may be exposed to prolonged exposure to outdoor or harsh environmental conditions, the cart, frame or portions thereof may be constructed of sturdy, weather resistant materials that are not prone to corrosion or are resistant to deterioration from such exposure. Such materials may include coated or painted steel, stainless steel, aluminum, anodized aluminum, fiberglass, etc. The cart 20 may be formed from a variety of different materials, however, both metal and non-metal, and should not be necessarily limited to any particular material.

The wheels may be mounted to the frame for rotation about a stationary axis, as is the front set of wheels 24 located towards the forward portion of the cart, or they may be pivotally mounted to the frame 22, such as the casters 26 mounted towards the rear end of the frame 22, which facilitates turning of the cart 20. Some or all of the wheels may be pneumatic to facilitate moving of the cart over rough or uneven surfaces and to absorb shock when moved over such surfaces. The wheels 24, 26 may also be provided with locking mechanisms (not shown) that may be selectively engaged to lock the wheels and prevent inadvertent rolling of the cart 20.

The frame 22 may be provided with front and rear walls 28, 30, respectively, and opposite sidewalls 32 (FIG. 3) and 33. Shelves or floors 34, 36 are mounted to the frame that generally define upper and lower internal storage areas 38, 40 that may be accessed through openings formed in the sidewall 33. A cart top or cover 42, which may be generally level or flat, may cover the upper storage area 38, the upper or exterior surface of which may also serve as a support or work surface of the cart 20. The walls and cover of the cart may be constructed and configured to prevent moisture from seeping into the interior or storage areas 38, 40 of the cart 20.

Upper and lower doors or closures 44, 46 may be provided for selectively closing the openings formed in sidewall 33 and to allow access to the enclosed storage areas 38, 40, respectively. In the embodiment shown, the upper door 44 is shown being pivotally coupled by hinges 48 to the frame 22 so that the door 44 swings between open and closed positions about a generally horizontal axis. The lower door 46 is also pivotally mounted to the frame 22 by means of hinges (not shown) so that the door 46 swings between open and closed positions about a generally vertical axis. Closure mechanisms or latches 52, 54 are also provided with the doors 44, 46, respectively, so that the doors 44, 46 can be selectively retained or locked in the closed position. Seals may be provided around the areas of engagement between the doors 44,46 and the frame 22 to prevent moisture, dust or other debris from seeping or entering into the interior of the cart 20 or storage areas 38, 40.

A data tag dispensing unit 56 is provided in sidewall 33. In the embodiment shown, the dispensing unit 56 consists of a slot formed in the wall 33 that allows passage of preprinted data tags 59 having an adhesive surface that may be releasably affixed to a roll or length of backing material that is housed within the interior of the cart 20 and fed through the slot 56. A data tag printer (not shown) may also be provided with the cart 20. The printer may be stored within the compartments 38, 40, with the tags 59 being fed through the slot 56.

A handle 60 or other device to facilitate moving and/or directing of the cart 20 may be mounted or coupled to the frame 22.

Mounted to the frame 22 is a reader 62. The reader 62 is mounted to the frame by means of a reader arm 64. The reader 62 may be configured and mounted to the frame 22 in a variety of ways. In the embodiment shown, however, the reader arm 64 includes an upright portion 66 that includes a tubular sleeve 68 that is stationarily mounted generally towards the forward or front end of the cart 20. Apertures may be formed in the cover 42 and upper shelf 34 for closely receiving the sleeve 68 so that the sleeve may pass or extend therethrough, with the lower end of the sleeve locating generally at the lower shelf or floor 36 of the cart. In the embodiment shown, a generally vertical tubular or cylindrical upright arm member 70 is received within the sleeve 68 and is supported therein. The arm member 70 may be moved longitudinally upward or downward within the sleeve 68 to thereby adjust the height of the reader arm 64 at various positions. Additionally, the arm member 70 may be pivoted about its longitudinal axis within the sleeve 68. A locking mechanism (not shown) may be provided with the sleeve 68 to selectively lock the arm member 70 relative to the sleeve 68 in various positions. A seal or other device (not shown) may be secured around the sleeve 68 or member 70 to prevent the seepage or entry of moisture, dust or debris into the interior portions of the cart 20.

Extending generally transversely from the upper end of the upright arm member 70 is a transverse tubular arm 74. The transverse arm 74 is shown as being a single stationary member that extends generally perpendicular to the upright member 70 and has a length of about 1.5 to about 3.5 ft, more particularly from about 2 to 3 feet. Optionally, the transverse arm 74 may be an extendible arm, which may be formed as two or more sections, such as the sleeve 68 and arm member 70, wherein the arm 74 may be extended or retracted longitudinally to various lengths. Wiring for electrical connections for the reader 62 may be passed through the interior spaces of the tubular members forming the reader arm 64.

Figure 5:
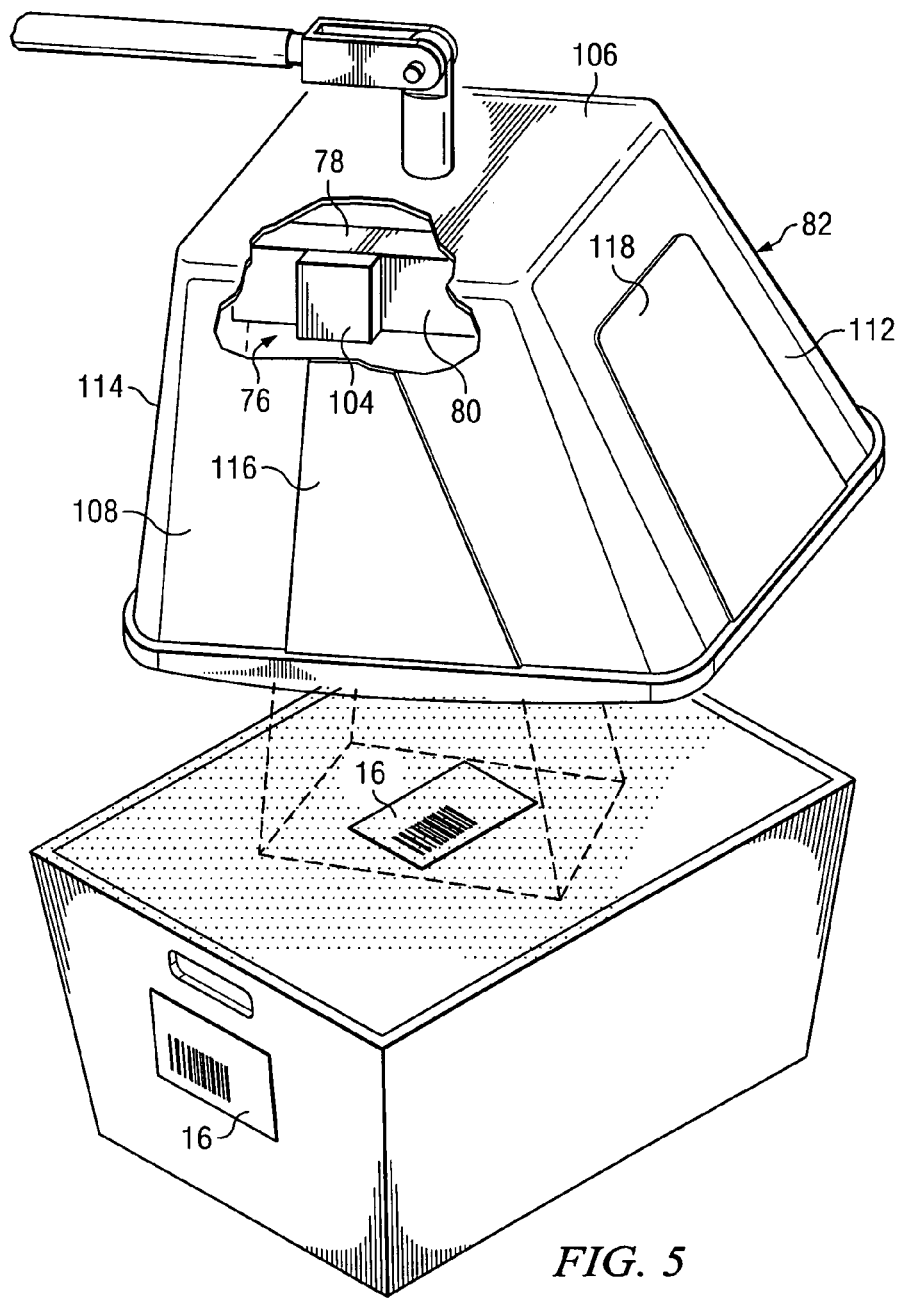
FIG. 5 is an enlarged perspective view of a shroud of a reader of the mobile data reading system, with the shroud partially sectioned to reveal a reader head of the reader.

At the end of the arm 74 is a reader head mount 76 (FIG. 5). The reader head mount 76 is pivotally connected to the end of the arm 74 opposite the upright member 70. The mount 76 may include a mounting plate 78 to which is coupled a reader head 80. In one embodiment, the reader head mount 76 may be pivotally mounted to the arm 74 for pivoting about three perpendicular axes. This allows the reader head 80 to be oriented in almost any orientation. An elastomeric or resilient shock-dampening pad, washers or other shock absorbing members (not shown) may be provided with the reader head mount 76 to facilitate dampening of any shock or impact imparted to the reader head 80.

Associated bearings or bushings (not shown) may be provided with those components of the reader arm 64 and reader head mount 76 to facilitate pivotal movement of the various components described above.

The reader head 80 may be an optical scanner or image reader, an RFID reader or other device capable of reading data or information from a data containing device that is brought within proximity of the device, as is described in further detail below. The reader 80 may be provided with a protective shroud 82, which is also described further below.

Mounted to the cart 20 is an internal electrical power source 84, which may be in the form of one or more batteries. The battery 84 is located within the lower storage compartment 40. Although various power sources or batteries may be used, in the embodiment shown and described, the battery 84 is a rechargeable dry cell battery. The battery 84 may be a 12 volt battery that is suitable for powering the electronic components of the system 18, which typically require 12 volt DC current. An example of a suitable commercially available 12 volt battery is that available as Northstar NSB90, available from the Northstar Battery Company, Springfield, Mo. A battery meter or "gas gauge"

(not shown) for estimating battery life may also be coupled to the battery or be provided with the system 18 to indicate if the battery 84 is in need of recharging or replacement. The battery may have a normal use life of from between about 10 to about 24 hours or more between recharging operations.

An electrical junction box 86 is also provided within the lower compartment 40 for housing electrical connections to the various electrical components of the system 18 and connecting them to the power source 84. Electrical couplings and wires from the various electrical components may be wired through the junction box 86 to the power source 84 and/or to each other. This facilitates and simplifies connecting and disconnecting of the various components to each other or the power source.

Figure 3:
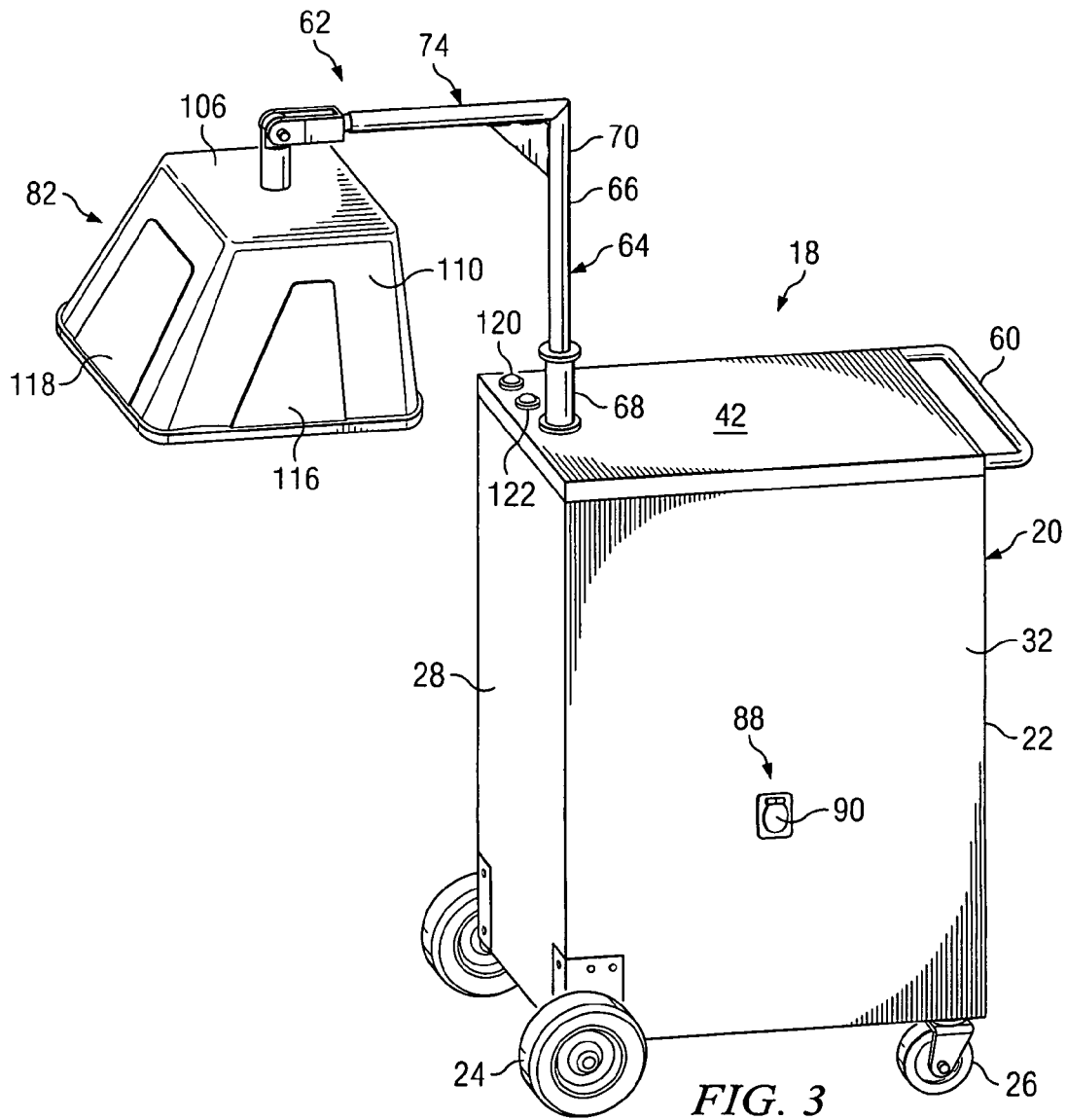
FIG. 3 is a left side perspective view of sidewall of the mobile data reading system of FIG. 2, showing a recharge connector to facilitate recharging of a battery for the system.

Referring to FIG. 3, a battery recharge connector 88 may be provided in the sidewall 32 for connecting the battery 84 to an external power source from the exterior of the cart 20. A cover 90 may be optionally provided for selectively covering the connector 88 when not in use to protect the connector 88.

In the upper compartment 38 of the cart 20, a pair of cradles or docking stations 92, 94 for accepting portable data storage devices 96 is provided. The cradles 92, 94 are powered by the battery 84 and are electrically coupled thereto by means of junction box 86. The cradles 92, 94 are also electrically coupled to one another and to the reader head 80 via junction box 86 to facilitate data transfer and the like therebetween, as will be discussed later on.

Figure 4:
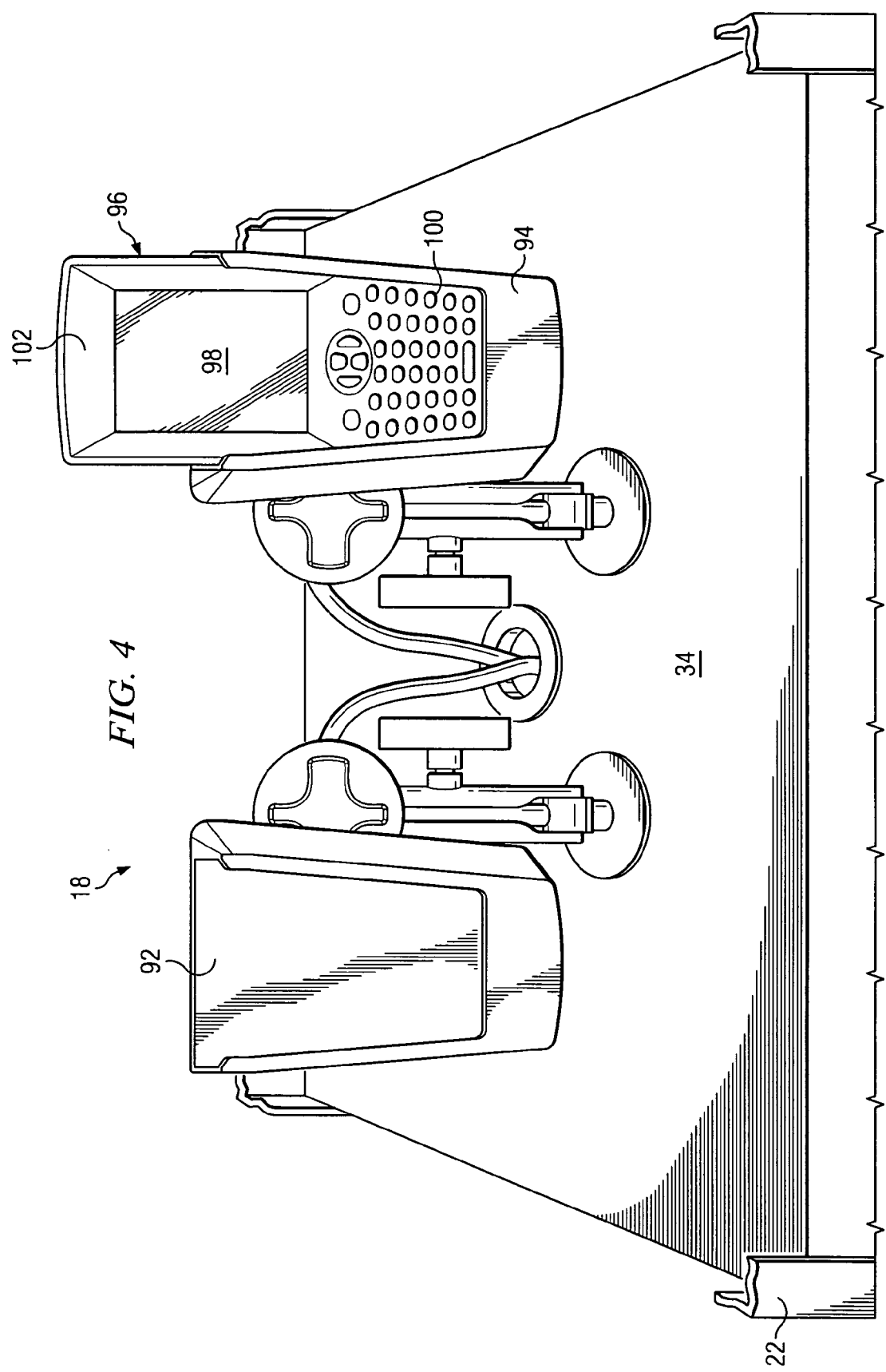
FIG. 4 is front perspective view of a pair of cradles of the mobile data reading system of FIG. 2, with a handheld computer held within one of the cradles.

The cradles 92, 94 are each configured to hold a removable, portable data storage device 96. Referring to FIG. 4, the device 96 may include a hand-held computer. In its most basic form, the device or computer 96 may include a power source or battery (not shown), a data processor (not shown), memory or a data storage area (not shown), a visual display or screen 98, an input or control device 100, and one or more programs or software (not shown), all which may be contained or housed within a housing 102 that is configured to be received and releasably held within one of the cradle or stations 92, 94. Included with the programs or software may be an operating system and one or more article tracking programs or applications, as well as applications or programs that allow for interfacing and/or communicating with other devices of the system 18.

The battery of the device 96 may be a rechargeable battery that may be recharged while being held in the cradle or station 92, 94. Additionally, power may be supplied to the device 96 from the cradle 92, 94 when mounted therein so that the battery of the device 96 remains charged. The control device 100 may include an alpha-numeric keyboard or a touch screen or pad, which may be operated with or without a stylus or other device. Electrical contacts or connection devices may be provided with the hand-held computer 96 and cradle 92, 94 for engagement with one another so that the hand-held devices 96 may be in electrical communication with the battery 84 and other devices of the cart 20, as discussed herein.

The hand-held devices 96 may also be provided with a data reading device (not shown) for reading data of the data tags 16 as described above. The reading device of the computer 96 may include an optical scanner or image reader or a RFID reader. In the embodiment shown, the reading device includes a built-in optical or image reader for reading bar codes and the like. The devices 96 may include read confirmation means in the form of audible, visual or tactile output or a combination of such output, to indicate a successful or unsuccessful read or scan operation. An example of a suitable commercially available computer and cradle combination includes the INTERMEC 740 mobile computer with a built-in imager or laser scanner, a 700 c Vehicle Dock, 700 c Vehicle Mount Cradle and 700 c Vehicle DC Power Installation Kit, all available from Intermec Technologies Corp., Everett, Wash. Other commercially available data reading devices and hand-held computers and cradles may be used as well. The devices 96 may also be provided with wireless communication or radio components, such as GPRS, Bluetooth™ 802.11B and 802.11G radio devices, for wireless connectivity to different environments. These may include such things as wireless local area networks (LAN), wide area networks (WAN) or personal area networks (PAN).

The reader head 80 is connected to and in electrical communication to one or both of the cradles 92, 94. Referring to FIG. 5, in the embodiment shown the reader 80 is an omni-directional laser scanner. An example of suitable commercially available scanner is the METROLOGIC TECH-10 long-range omni-directional scanner with a 25 line scan pattern, available from Metrologic Instruments, Inc., Blackwood, N.J. Other commercially available scanner or readers may be used as well. The reader may have an effective scanning or reading range of 1 meter or less, more particularly from about 0.2 meters to about 0.5 or 0.6 meters. The reader 80 may be enclosed in a protective closure, such as a NEMA 3 or 3R enclosure with a clear cover portion to allow passage of the projected scan field therethrough. The protective closure may facilitate protecting of the reader 80 and its internal components from driven rain, snow, sleet, dust, etc.

Because the system 18 may be placed in outdoor locations that are subjected to extreme environments of heat and cold, a heat transfer device 104 may also be coupled to the reader 80 or other components to protect the reader from such temperature extremes. The device 104 may be in the form of one or more thermoelectric coolers, which may provide both heating and cooling to the reader head 80. Such thermoelectric heat transfer devices operate on the Peltier effect, wherein heat is evolved or absorbed between the junction of two dissimilar metals that carry electrical current. Heating or cooling is dependent upon the direction of the current. Such devices may include an electric fan and fins or other heat transfer surfaces to facilitate heat transfer. A thermostat or controller may be provided with the device to regulate the heating and cooling. An example of a suitable commercially available thermoelectric cooler is the direct-to-air (DA) thermoelectric cooler available as TE ASSEMBLY 12VDC, No. DA-075-12-02-00-M1, which is available from Supercool AB, Göteborg, Sweden. Such assembly may be attached directly to an aluminum or other metal surface of the reader head 80 to facilitate cooling or heating.

The reader shroud 82 or portions thereof may be generally opaque to prevent the passage of light therethrough to provide a projected shaded area, as will be discussed more fully below. The shroud 82 also facilitates protecting the reader 80 from exposure to wind, rain, sleet, dust, etc. The shroud 82 is provided with an upper wall 106 and downward projecting sidewalls 108, 110 and front and rear sidewalls 112, 114. The shroud 82 is positioned over and secured to the mounting plate 78 and is configured so that the reader 80 is recessed within the upper portion of the shroud 82.

As can be seen in FIG. 5, the shroud sidewalls 108, 110, 112, 114 project downward beyond the lower extent of the scanner 80. The sidewalls may also project downward from the scanner 80 a distance of several inches (egs. 3–15 inches). The downwardly projecting shroud sidewalls may be configured so that they are laterally spaced a distance from the scan field projected by the reader 80. This ensures that they do not interfere with the projected field. Because the transverse cross-sectional area of the scan field may expand laterally outward with increasing longitudinal distance from its origin, the shroud sidewalls may also be configured to project laterally outward as well. The lateral distance of the downwardly projecting sidewalls of the shroud 82 from the edges of the scan field may be from less than about 2 inches to about 10 inches, or more. In the embodiment shown, visible contrasting areas 116, 118 are provided on the exterior of the shroud walls. The contrasting areas are configured to approximate the position of the projected scan or read pattern of the reader 80 to facilitate positioning of articles being scanned thereunder, as discussed below. In the embodiment shown, the contrasting areas 116, 118 are raised areas of the shroud surface, but other indicia may also be used. The shroud 82 may provide a transverse cross-sectional shrouded area at its opening that is about 1 to 5 times the transverse cross-sectional area of the projected scan or read pattern.

Provided with the system 18 are scan or read confirmation device(s). This may include a speaker or other audio output device (not shown) that is provided with the cart 20 to provide different audible indications associated with successful or unsuccessful scans. Additionally, different lights or visual displays 120, 122 may be provided on the outer surface of the cart 20 in a prominent area that may be easily seen by one performing a scan operation. Each of the displays 120, 122 may be associated with one of a positive or negative indication of a successful scan operation. For example the display 120 may be a green light to indicate a positive scan, while display 122 may be a red light to indicate an unsuccessful scan. The prominent displays 120, 122 are particularly useful on tarmac and ramp areas of airports where noise levels may be high and which could drown out audible indications of scan operations.

During use of the cart 20, the battery meter (not shown) may be checked intermittently to ensure that the battery 84 has sufficient power to continue operating of the system 18. If the meter reflects a low or depleted power level, the cart 20 may be moved, if necessary, and connected to an external power source or battery charger by means of the recharge connector 88 so that the battery 84 is charged for further use.

The scanning system 18 has particular application in the tracking and monitoring of articles being shipped or transported. In particular, the system 18 may be used in tracking mail that is transported aboard commercial aircraft. In an example of how the tracking system 18 may be used for tracking such articles, individual pieces of mail that are addressed to common locations or destinations may be collected and grouped in containers, such as the containers 10, 12, 14. Each of the containers 10, 12, 14 may be supplied with a data tag, such as the data tag 16, which contains unique identifying information, as discussed previously. The tag 16 may also include printed information that is readable by the person handling the container or article so they can ascertain the destination and routing of the article or container or other information indicated thereon.

In instances where mail or articles are being tendered by one entity to another for further handling and/or delivery, the mail or containers 10, 12, 14 may be initially be presented at a specific location for tender. This may be at an air mail center or cargo facility of an airport that is associated with or used by a postal service or other first entity tendering the mail or articles for delivery. At such locations, electrical power and/or storage areas for equipment, such as the scanning system 18, of the air carrier or second entity may not be provided. Furthermore, such areas may be located outdoors or in non-enclosed areas where such equipment may be exposed to the environment and extreme weather conditions.

Figure 6:
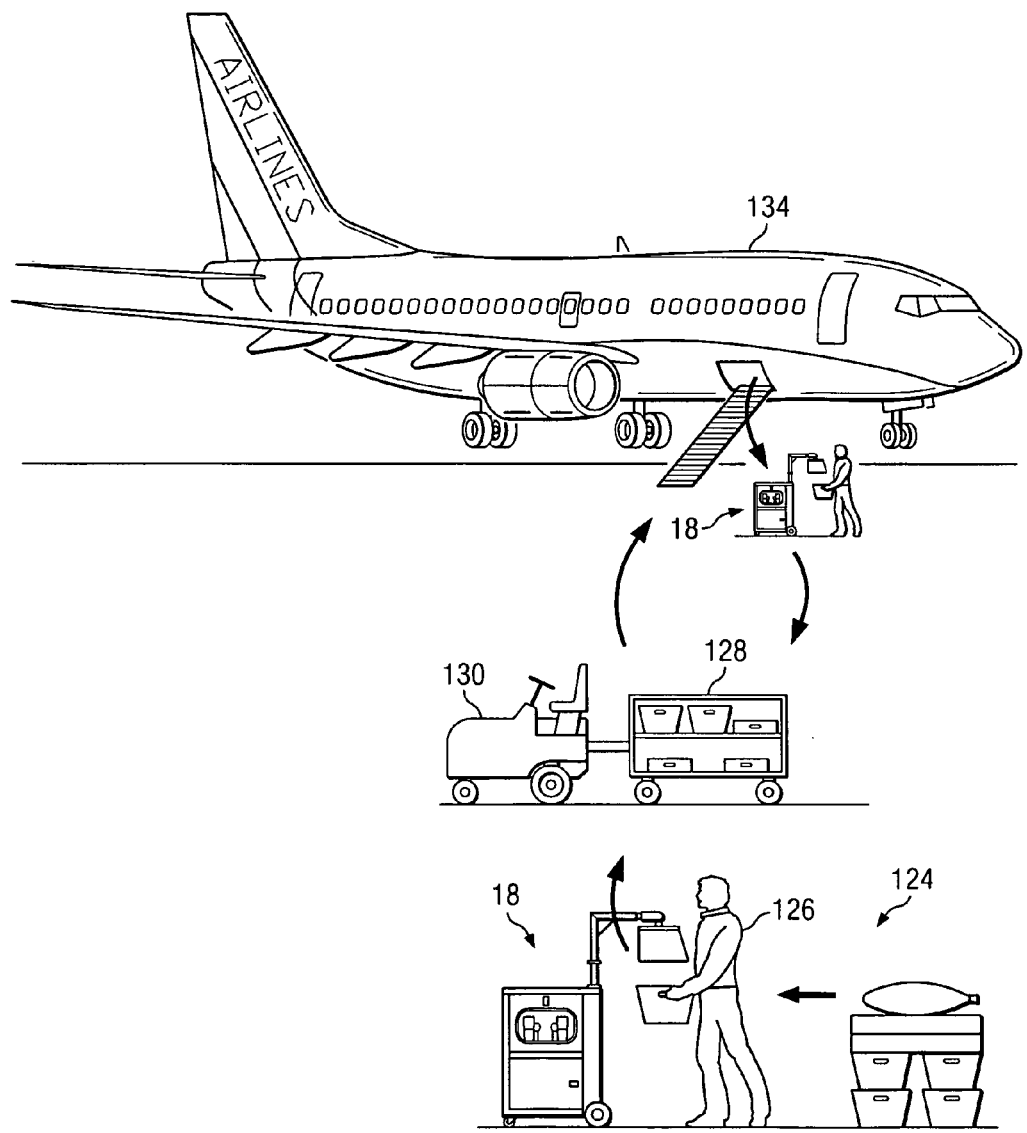
FIG. 6 is schematic of the mobile data reading system being used for the reading of articles being transported via an aircraft.
Figure 7:
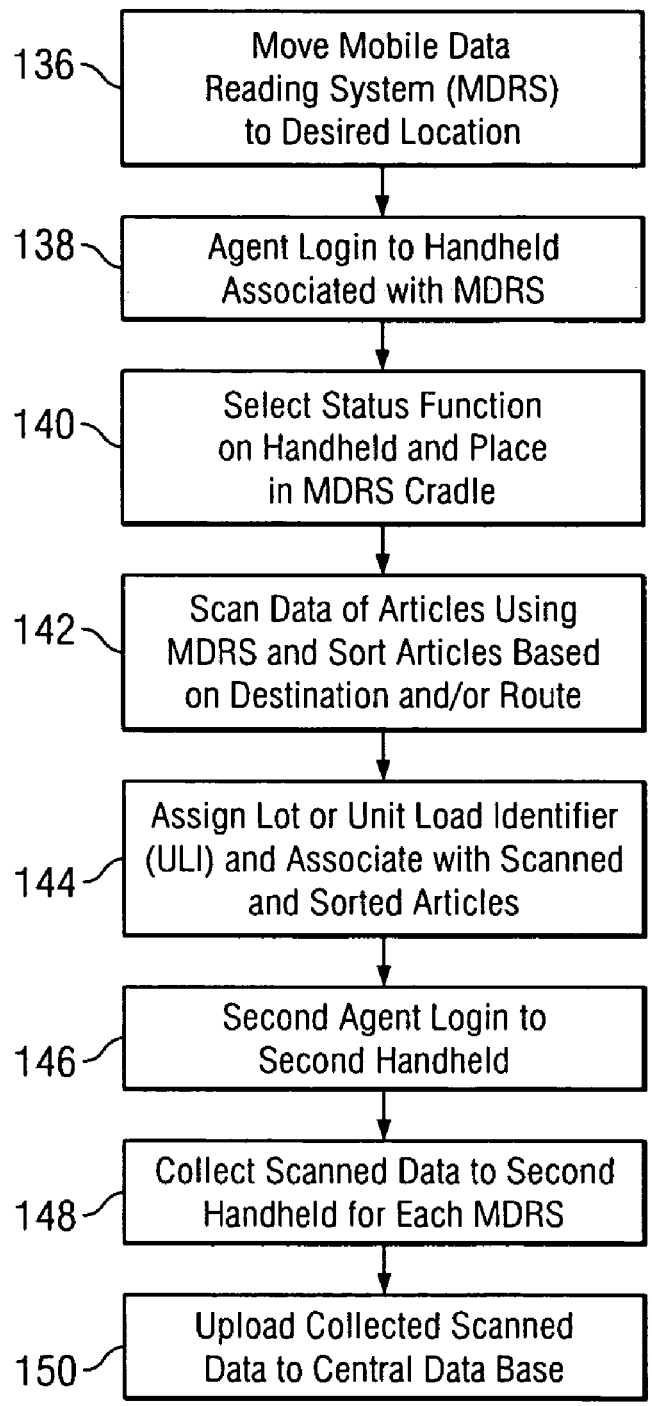
FIG. 7 is a flow diagram illustrating steps that may be used in the tracking of articles using the mobile data reading system.

In an initial possession operation, the scanning system 18 may be moved from a storage area or other offsite location to the tender area 124 (FIG. 6) where the mail or articles are being tendered for delivery. This is indicated at 136 in the flow chart of FIG. 7. Transport of the scanning system 18 is facilitated by the wheels of the cart 20, which allow the system 18 to be readily moved from place to place over a support surface. During transport and/or storage of the system 18, the reader arm 64 may be rotated to a retracted or storage position wherein the transverse arm 74 and scanner head 80 are positioned generally over the cart top 42.

Once the scanning system 18 is located at the tender location, if not already powered, power may be provided to the devices of the system 18 by means of a power switch (not shown), which may be provided with the junction box 86. Electrical power to the system devices is provided by means of the battery 84 to all the system devices. The reader arm 64 may be rotated or moved to an extended or read position wherein the scanner head 80 is located at a position laterally away from the frame 22 of the cart 20. If necessary, the height of the scanner head 80 may be adjusted by moving or adjusting the position of the arm member 70 within the sleeve 68. The height of the reader head 80 may be from 3.5 feet or more from the support surface on which the cart 20 rests. Typically, the reader head will be from 4.5 to 6 feet or more from the support surface. The scanner head 80 may also be articulated to a desired position to facilitate scanning or reading or articles.

An agent 126 of the air carrier or second entity receiving the tendered articles 10, 12, 14 may utilize a handheld computer 96 provided or associated with the system 18. The computer 96 is provided with an article tracking application or software. A selection menu or prompting device, which may appear on the display screen 98 may be provided by the application. This allows the possession agent to login or sign on 138 so that the identity of the possession agent may be recorded or reflected during the possession scanning operation.

The possession agent may select a "status" function 140 of the tracking application from the prompt or menu of the handheld 96, which connotes the status of the articles being scanned. This status indication may include a general descriptor, such as "possession," "load", "delivery," etc. The time and date of scanning, the location of the scan operation or articles being scanned, the identity of a person, such as the one performing the scan operation or receiving the articles, etc. may be associated with the status indication.

At the tender area, a possession function may be selected for the status function 140. The handheld may then be placed within one of the cradles 92, 94, if not already positioned therein. The handheld 96 may automatically detect the scanner 62, and other devices of the system 18, which is electrically coupled to the handheld 96 through the cradle 92. Applications or software for such detection and communication with the system devices can be provided with the handheld for this purpose.

The possession agent may then proceed with the scanning and sorting 142 of mail or articles to be delivered. This may involve the agent visually inspecting the printed information provided on the data tag 16 to determine the flight and/or destination. The agent may then pass the article under the scanner head 80 so that the data tag 16 is read by the scanner 62. The scanner head 80 is located at a position that enables the agent to scan the articles or containers of mail quickly, without requiring any handling of the scanner head 80 by the agent. The agent merely passes the articles or containers under the scanner head 80 as they are being sorted. In certain situations, the agent may be able to hold articles simultaneously in each hand and pass each sequentially under the scanner head 80 where the data tags 16 of each are read. This may be done in a fluid, continuous motion while simultaneously moving the articles to a sorted location, thereby hastening the scanning and sorting operation.

For optical scanners, the shroud 82 may provide a shaded shroud area that may be projected onto the surface of the article being scanned to facilitate scanning in strong sunlight or bright light. Successful or unsuccessful scanning is indicated by the displays 120, 122 or audio output devices of the cart 20. The data from data tag 16 from a successful scan is automatically transmitted and stored in the handheld computer 96 held within one of the cradles 92, 94. If necessary, the handheld 96 may also be removed from its cradle and be used to scan the data tags of the articles, as well. If a scan is unsuccessful, the information on the data tag may be manually keyed or entered into the handheld 96 so that the information is stored therein.

After scanning, the scanned mail containers or articles may be sorted and placed in a designated area associated with the flight and/or destination of the article. This may include positioning the articles on a baggage cart 128 (FIG. 6), which may be connected to a cart tug 130 or other vehicle used for transporting them from place to place. One or more such carts or vehicles may be provided at the tender area for this purpose.

In one example, to facilitate tracking of articles, once an article for a flight or destination is scanned by the system 18 and placed in the designated area, a lot or unit-load identifier (ULI) tag may be secured to at least one of the articles associated with a particular flight and/or destination. The ULI tag may include an optically scannable bar code or other optically readable device or a RFID tag, which may be similar to that used for the data tags 16 of the individual articles. The ULI tag has a unique identifier or code provided thereon. The ULI tags may be dispensed from the cart 20 as tags 59 from tag dispenser 56. The article with the ULI tag attached may be positioned in a prominent area and be provided with a distinctive appearance so that it is readily distinguished from the data tags 16 of the individual articles.

The possession agent may select an assignment function from the tracking application of the handheld 96 and scan the ULI tag. Alternatively, the handheld 96 or other device may be connected to a printer (not shown) within one of the compartments 38, 40 for printing such tags. During the assignment operation 144, a data tag 16 of one of the articles is also scanned. The assignment operation 144 associates the ULI with the flight and/or destination of the scanned data tag 16. This eliminates the need to scan the data tag 16 of each individual article or item to determine their status, as scanning of the ULI provides the status of all items associated with the particular ULI and associated data tag 16.

Upon completion of scanning and sorting of the articles 142 and assignment 144 of the ULI data, the possession data may be harvested or collected 148 from the scanning system 18. This may be performed by a second agent associated with the air carrier or second entity. A second handheld computer 96 may be used by the second agent for collecting such data from multiple scan carts 20. Such agent may also sign or log in 146 to reflect the identity of the individual when using the handheld. To harvest 148 the data, the second handheld is temporarily positioned in the second cradle 92, 94. When positioned therein, the two handheld computers automatically detect one another and begin to communicate. Communication and data transfer may also be conducted wirelessly between the handhelds if the handhelds 96 are provided with wireless or radio communication capabilities and components, as previously discussed. In such cases, it may be unnecessary to position or dock the collecting handheld computer within one of the cradles.

When the scan cart 20 is no longer needed, it may be removed or moved to another location remote from the tender area or area where the scanning operation was carried out.

All transactions that may not have been previously collected are copied from the scanning system 18 and are collected in the second handheld unit during this collection operation 148. Data from the second handheld may also be transmitted to the handheld that remains with or is otherwise associated with the individual scanning cart 20 during this operation 148. A message or notification may be displayed or provided on at least one of the handhelds 96 that the copy or data transfer has been completed. The data may include the list of all the scanned articles and the ULI information associated with each group of sorted articles.

Upon completion of the data transfer for the scan cart 20, the handheld may then be carried by the second agent to other scan carts or systems and the collection operation 148 repeated for these scan carts as well. These may be located at different locations or tender areas. The second or another agent may also take possession of the scanned and sorted articles after completion of the collection operation for delivery to a particular flight or other staging location.

The second handheld that has been used for collection of the possession data may then be used to transfer the collected data to a main or primary article tracking system or central database in a data upload operation 150. This may be done by docking or connecting the handheld to such system or database through a docking station or other connection device, which may be located at one or more sites, such as at gate locations used for the arrival and departure of flights. The data upload operation may also utilize wireless data transfer if wireless connections or capabilities are provided with the devices and systems, as previously discussed. The central database may be accessible to the first entity so that they may monitor the status of the articles that have been tendered for delivery to the air carrier or other entity.

During the upload operation 150, the possession data collected from the individual scan carts 20 is uploaded to the central database. Updated data from the central database may also be transmitted to the second handheld during this operation 150.

Further tracking of the articles may occur at various stages in the transporting and delivery process. Instances of stages where scan operations may be executed include initial possession or tender areas, staging, load, transfer or unload areas and final delivery areas. For example, the ULI tags may be scanned at the gate area as the articles are being loaded onto the aircraft 134 for transporting. A final scan of the data tags of individual articles may be executed on or prior to delivery after the articles have been offloaded from the aircraft.

By scanning or reading of the ULI tag associated with a particular group of articles or by scanning or reading of the individual data tags 16 of each article with a handheld 96 or scanning cart 20, and providing a status indicator associated with that particular scanning or reading operation, information or data regarding the location and status of the article may be recorded or reflected by the system. This may then be transmitted or transferred to a central database or tracking system through docking operations or by wireless data transfer, as previously discussed. The data of the central database or tracking system may be monitored by the air carrier or other entities to determine the location and status of the various articles being transported.

The scanning system has several advantages. The scanning system is mobile so that it can be readily moved from place to place where it may be needed. The scanner head can be easily moved into and out of a retracted position for storage and transporting. The mobile scanning system may be self contained so that it does not need additional equipment or an external power supply when on location when performing scanning operations. It may also be used in variety of environments, where extreme weather conditions may be encountered.

Because the scanning system is a hands-free scanning system and does not require handling of the scanner by the user, the one performing the scanning operation may have two hands available at all times to move articles being scanned and sorted. Where heavy or large articles are involved, both hands are now free to move the article. There is no need to set aside any handheld scanner, as may be necessary with the prior art scanning methods. The scanning system takes advantage of the user's natural motion. The position and orientation of the reader head and the projected scan field allows a user to simultaneously scan and sort the articles in one fluid motion by passing the articles through the scan field as they are being simultaneously moved to a sorted location. This greatly reduces the amount of time necessary for scanning operations and ensures the likelihood that the articles being scanned and sorted will be timely delivered to their destinations. Because the user may have both hands free, it may be possible in certain instances for the user to hold and scan more than one article at a time. This also greatly speeds the scanning and sorting operation.

Because the user is not required to perform repetitive, dexterous movements of the hand, such as with the swiping action of some handheld scanners, the individual may be able to perform the scanning operation longer with less fatigue or likelihood of injury. The scanning system is ergonomic and can be adjusted to suit the individual's physical characteristics. Thus, for tall users, the reader head is easily positioned at higher levels, and for shorter users, the reader head may be positioned at lower levels. This provides an optimal scan field height for the user when scanning articles so that no stooping or lifting by the user to raise or lower of the articles being scanned is required.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A mobile data reading system for reading bulky data-associated articles being manually handled by a user, the system comprising:
    a frame mounted on rollers to facilitate moving the frame over a support surface to selected locations;
    a reader having a reader head mounted to the frame for receiving a data signal from a data-associated item to be read when the article is brought within a proximal distance to the reader head without requiring handling of the reader head by the user during scanning of articles;
    a data storage device for receiving and storing data associated with the received data signal, the data storage device including at least one hand-held data reader removably mounted to the frame that is separate from the mounted reader and is independently capable of receiving a data signal from a data associated article; and
    a power supply for supplying power to the reader.

2. The mobile data reading system of claim 1, wherein:
    the reader head is spaced apart a distance from the frame to facilitate scanning of the bulky articles by bringing the articles within the proximal distance of the reader head without interfering with the frame.

3. The mobile data reading system of claim 2, wherein:
    the reader head is selectably movable on an arm between a retracted position and an extended position wherein the reader head is spaced apart from the frame.

4. The mobile data reading system of claim 1, further comprising:
    at least one hand-held reader station mounted to the frame for receiving the hand-held data reader, the reader station receiving and transmitting the data from the reader to the hand-held data reader when the hand-held data reader is received by the reader station.

5. The mobile data reading system of claim 4, wherein:
    there are two hand-held reader stations mounted to the frame for receiving two hand-held data readers, and wherein data from one band-held data reader is transmitted to the other when received by the reader stations.

6. The mobile data reading system of claim 1, wherein:
    the reader head is articulable about at least two axes for orienting the reader head at different orientations.

7. The mobile data reading system of claim 1, wherein:
    the reader head is located at a position at least 3.5 feet above the support surface.

8. The mobile data reading system of claim 1, wherein:
    the proximal distance is 1 meter or less.

9. The mobile data reading system of claim 1, wherein:
    the hand-held data reader includes a handheld computer with an optical scanner.

10. The mobile data reading system of claim 1, further comprising:
    a reader head shroud that covers the reader head.

11. The mobile data reading system of claim 10, wherein:
    the shroud provides a shaded area over a scan field of the reader.

12. The mobile data reading system of claim 11, wherein:
    the shroud has sidewalls that project beyond the reader head and are spaced laterally apart from a projected scan field of the reader.

13. The mobile data reading system of claim 1, further comprising:
    a heat transfer device coupled to the reader head for transferring heat away from and to the reader head.

14. The mobile data reading system of claim 13, wherein:
    the heat transfer device includes a thermoelectric cooler.

15. The mobile data reading system of claim 1 wherein:
    the reader head is a non-hand-held reader head.

16. A self-contained mobile data reading system for reading data associated with bulky articles having data indicia thereon, the system comprising:
    a frame mounted on rollers to facilitate moving the frame over a support surface to selected locations;

a non-hand-held optical scanning device mounted to the frame having an optical scanner for projecting a scanning field for reading optically scanned data indicia of the articles when the data indicia is brought within the scanning field of the optical scanner without requiring handling of the optical scanner by the user, the optical scanning device providing at least one of a audible or visual notification upon completion of a successful scan of the data indicia;

a data storage device for receiving and storing data from the optical scanning device, the data storage device including a removable hand-held data reader having an optical scanner that is separate from that of the non-hand-held reader and is independently capable of projecting a scanning field for reading optically scanned data;

at least one hand-held-reader station mounted to the frame for receiving the hand-held data reader and that transmits data from, the non-hand-held optical scanning device to the hand-held data reader; and a battery power supply mounted to the frame for supplying power to at least one of the optical scanning device and the hand-held reader station.

17. The mobile data reading system of claim 16, wherein: the optical scanner is mounted on an articulable arm for orienting the optical scanner at different positions and orientations.

18. The mobile data reading system of claim 16, wherein: there are two hand-held reader stations mounted to the frame for receiving two hand-held data readers.

19. The mobile data reading system of claim 16, wherein: there are two hand-held reader stations mounted to the frame for receiving two band-held data readers, and wherein data from one hand-held data reader is transmitted to the other when received by the reader stations.

20. The mobile data reading system of claim 16, wherein: the reader head is selectably movable on an arm between a retracted position and an extended position wherein the reader head is spaced apart from the frame.

21. The mobile data reading system of claim 16, wherein: the reader head is articulable about at least two axes for orienting the reader head at different orientations.

22. The mobile data reading system of claim 16, wherein: the reader head is located at a position at least 3.5 feet above the support surface.

23. The mobile data reading system of claim 16, wherein: the proximal distance is 1 meter or less.

24. The mobile data reading system of claim 16, wherein: the hand-held data reader includes a handheld computer with an optical scanner.

25. The mobile data reading system of claim 16, further comprising:
a reader head shroud that covers the reader head.

26. The mobile data reading system of claim 25, wherein: the shroud provides a shaded area over a scan field of the reader.

27. The mobile data reading system of claim 26, wherein: the shroud has sidewalls that project beyond the reader head and are spaced laterally apart from a projected scan field of the reader.

28. A method of tracking articles being shipped comprising:
providing a plurality of articles to be tracked with identifying data associated therewith at a first location;

moving a mobile data reading system from a remote location to the first location for reading the identifying data, the mobile data reading system including:
    a frame mounted on rollers to facilitate moving the frame over a support surface to selected locations;
    a reader mounted to the frame, the reader having a reader head for receiving a data signal from a data-associated item to be read when the article is brought within a proximal distance to the reader head without requiring handling of the reader head by the user during scanning of articles, the reader head being spaced apart from the frame a distance to facilitate scanning of bulky articles without interfering with die frame;
a data storage device for receiving and storing data associated with the received data signal mounted on the frame; and
a power supply for supplying power to the reader;
performing a reading operation at the first location by manually bringing each of the articles with identifying data within the proximal distance of the reader head so that the identifying data is read by the reader without handling of the reader head by one performing the reading operation, the reader providing at least one of an audible or visual notification upon completion of a successful scan of the data indicia; and
storing the read identifying data within the data storage device.

29. The method of claim 28, further comprising:
sorting the articles into discrete groups based upon shipping destination of the articles upon performing the reading operation;
downloading the stored read identifying data from the data storage device with a portable data reading device that is brought into proximity to the data storage device upon sorting of the articles; and
uploading the downloaded data from the portable data reading device to a central database.

30. The method of claim 28, further comprising:
sorting the articles into discrete groups upon performing the reading operation based upon shipping destination of the articles;
providing a unit-load identifier (ULI) with the articles of at least one discrete group that has been scanned during the reading operation; and
performing an assignment operation to associate the ULI with the at least one discrete group.

31. The method of claim 30, wherein:
there are at least two mobile data reading systems each having stored read identifying information and ULI information; and further comprising
collecting the stored read identifying information and ULI information from each of at least two mobile data reading systems.

32. The method of claim 31, wherein:
the data storage device of each mobile data reading system includes a removable hand-held data reader that is removably received within one of two hand-held-reader stations mounted to the frame, and wherein the stored read identifying information and ULI information is collected by transmitting the read identifying information and ULI information to another hand-held-reader when said another hand-held-reader is received by the reader station.

33. The method of claim 30, wherein:
providing a ULI identifier includes providing a ULI tag dispenser with the mobile data reading system and dispensing a ULI tag from the dispenser and securing the tag to at least one article of the at least one discrete group.

* * * * *